(12) United States Patent
Hyun et al.

(10) Patent No.: US 7,742,264 B2
(45) Date of Patent: Jun. 22, 2010

(54) HYBRID-TYPE SUPERCONDUCTING FAULT CURRENT LIMITER

(75) Inventors: Ok-Bae Hyun, Daejeon (KR); Hye-Rim Kim, Daejeon (KR); Seong-Woo Yim, Daejeon (KR); Jung-Wook Sim, Cheongju-si (KR); Kwon-Bae Park, Daejeon (KR); Bang-Wook Lee, Cheongju-si (KR)

(73) Assignees: Korea Electric Power Corporation, Seoul (KR); LS Industrial Systems Co., Ltd., Seoul (KR)

( * ) Notice: Subject to any disclaimer, the term of this patent is extended or adjusted under 35 U.S.C. 154(b) by 36 days.

(21) Appl. No.: 12/003,541

(22) Filed: Dec. 28, 2007

(65) Prior Publication Data

US 2009/0052097 A1 Feb. 26, 2009

(30) Foreign Application Priority Data

Aug. 20, 2007 (KR) ...................... 10-2007-0083221

(51) Int. Cl.
*H01F 1/00* (2006.01)
(52) U.S. Cl. ........................ 361/19; 335/216
(58) Field of Classification Search ................... 361/19; 505/220, 850; 335/216
See application file for complete search history.

(56) References Cited

U.S. PATENT DOCUMENTS

| 5,225,395 | A | * | 7/1993 | Tashiro et al. | ................. 361/19 |
| 5,333,087 | A | * | 7/1994 | Takechi et al. | ................. 361/19 |
| 5,600,522 | A | * | 2/1997 | Hull | ............................ 361/19 |
| 6,147,844 | A | * | 11/2000 | Huang et al. | .................. 361/19 |

* cited by examiner

*Primary Examiner*—Danny Nguyen
(74) *Attorney, Agent, or Firm*—Jerald L. Meyer; Derek Richmond; Brooks Gifford III

(57) ABSTRACT

Disclosed is provided a hybrid-type superconducting fault current limiter for rapidly limiting a fault current, the fault current limiter having a first circuit and a second circuit which are connected in parallel with each other, wherein the first circuit includes a superconductor and a circuit breaker which are connected in series with each other, and wherein the second circuit includes a driver having a driving coil and an electromagnetic repeller, a short contact connected in parallel with the driver, and a current limiting unit connected in series with a third circuit including the driver and the short contact. The hybrid-type superconducting fault current limiter comprises a power semiconductor element switch connected in series with the first circuit, the power semiconductor element switch normally maintaining an ON state and being activated and changed into an OFF state by a fault sensing signal generated according to an inflow of the fault current.

19 Claims, 5 Drawing Sheets

HYBRID-TYPE SUPERCONDUCTING FAULT CURRENT LIMITER

CROSS-REFERENCE TO RELATED PATENT APPLICATION

This application claims priority to Korean Patent Application No. 2007-0083221, filed Aug. 20, 2007, the contents of which are herein incorporated by reference in their entirety.

BACKGROUND OF THE INVENTION

1. Technical Field

The present invention relates to a hybrid-type superconducting fault current limiter, and more specifically, to an improvement in operational reliability of a hybrid-type superconducting current limiter which is capable of eliminating an arc current of a circuit breaker that might be occurring while a high-speed switch transfers to a current limiting unit the fault current detected by a superconductor when the fault current flows in the fault current limiter.

2. Discussion of the Related Art

A superconductor exhibits zero resistance during its normal operation state in a system, however, when a fault current flows in the system, the superconductor is quenched, and therefore, produces resistance which limits the fault current. At this time, the resistance may cause considerable energy to be applied to the current limiter. As a voltage applied to the system that runs the superconductor is high, the energy flowing in the superconductor correspondingly increases due to the impedance produced at the superconductor. Accordingly, lots of superconductors are needed to distribute the energy.

However, the superconductor is expensive in price and lots of superconductors mean large volume, which may increase the costs for installing and cooling the superconductor. To overcome the above problems, a hybrid-type superconducting fault current limiter including an existing circuit breaking means and a small number of superconductors has been disclosed (See Korean Patent Application No. 10-2006-0077520 filed on Aug. 17, 2006).

FIG. 1 is a circuit diagram illustrating a structure of a hybrid-type superconducting fault current limiter according to a prior art.

Referring to FIG. 1, the fault current limiter includes a main circuit and an auxiliary circuit. The main circuit includes a high-speed switch 2, which has a circuit breaker 2a, a driving coil 2b, and an electromagnetic repeller 2c, and a short contact 2d, and a superconductor 1 connected in series with the circuit breaker 2a. The auxiliary circuit includes a current limiting unit 3 for limiting the fault current. The circuit breaker 2a is mechanically linked with the electromagnetic repeller 2c and the short contact 2d, so that, in a case where a current is applied to the driving coil 2b, an eddy current is developed across the electromagnetic repeller 2c, and therefore, the circuit breaker 2a is operated together with the short contact 2d. The current limiting unit 3 may include a power fuse, a resistor, a reactor, a superconductor, a semiconductor element, and the like which have impendence to limit the fault current.

FIG. 2 is a graph showing a test result of the hybrid-type superconducting fault current limiter, and FIG. 3 is a graph showing operational points of time of the hybrid-type superconducting fault current limiter based on the test result of FIG. 2. In FIGS. 2 and 3, the current limiting unit 3 includes a current limiting fuse and a resistor connected in parallel with each other.

Referring to FIGS. 1 to 3, an electric current $I_{tot}$ passes through the closed circuit breaker 2a and superconductor 1 during a normal operation state without any fault, so that loss caused by occurrence of resistance is substantially '0'. In a case where a fault current flows into the fault current limiter, however, the superconductor 1 starts to be quenched at very high speed (6-1), and impedance developed at the superconductor 1 bypasses the fault current to the driving coil 2b. Since the fault current limiter is designed such that the impedance is very small, a low voltage alone is instantly applied from the electric power system to the fault current limiter, so that a small number of superconductors may be sufficient to implement the fault current limiter. At this time, a magnetic field is generated by the current flowing into the driving coil 2b, and an eddy current having a diamagnetic component is induced at the repeller 2c located over the driving coil 2b. Accordingly, the repeller 2c moves fast and opens the circuit breaker 2a that is mechanically linked with the repeller 2c thereby to cut off the inflow of the fault current into the superconductor 1 (6-2). The minute that the circuit breaker 2a is open, an arc current occurs across the circuit breaker 2a, which causes the fault current to continue to flow into the superconductor 1. To eliminate the arc current, the fault current limiter is designed to close the short contact 2d that is mechanically linked with the electromagnetic repeller 2c (6-3). The short contact 2d serves to remove the arc current occurring across the circuit breaker 2a connected in series with the superconductor 1, and protect the driving coil 2b from inflow of the fault current. The whole fault current is transferred through the short contacts 2d to the auxiliary circuit, and therefore, the arc current across the circuit breaker 2a is eliminated (64) and then the fault current is transferred to the auxiliary circuit and reduced by the current limiting unit 3 (6-5). Here, the current limiting unit 3 is designed to lag behind the superconductor 1 and high-speed switch 2 in operation.

FIG. 4 is a graph showing a test result when the electric arc was not blocked by the main circuit of the fault current limiter, and FIG. 5 is a graph showing a test result of $I_{main}$ when the electric arc was not blocked by the main circuit of the fault current limiter. Referring to FIGS. 4 and 5, the electric arc occurring across the circuit breaker 2a that is connected in series with the superconductor 1 could not be sufficiently removed before the current limiting unit 3 starts to operate due to difference in impedance between the main circuit and the auxiliary circuit that functions to limit the current (7-1). Accordingly, an electric arc is reproduced across the circuit breaker 2a due to the difference in impedance between the main circuit and the auxiliary circuit (7-2), which can reduce the arc impedance, so that the fault current can go through the superconductor 1 that changed into a normal conductive state and the circuit breaker 2a that becomes conductive due to the electric arc. At this time, most of voltage is applied to the superconductor 1 that is in a normal conductive state, so that the fault energy may flow into the superconductor 1, thus damaging the superconductor 1.

SUMMARY OF THE INVENTION

The present invention provides a hybrid-type superconducting fault current limiter which is capable of improving its operational reliability by removing its malfunctions caused by the arc current remaining at the circuit breaker or making the circuit breaker run in a no-load state. In an exemplary embodiment, an exemplary embodiment of the present invention provides a hybrid-type superconducting fault current limiter for rapidly limiting a fault current, the fault current limiter having a first circuit and a second circuit which are connected in parallel with each other, wherein the first circuit includes a superconductor and a circuit breaker which are connected in series with each other, and wherein the second circuit includes a driver having a driving coil and an electromagnetic repeller, a short contact connected in parallel with the driver, and a current limiting unit connected in series with a third circuit including the driver and the short contact, the hybrid-type superconducting fault current limiter comprising: a power semiconductor element switch connected in series with the first circuit, the power semiconductor element switch normally maintaining an ON state and being activated and changed into an OFF state by a fault sensing signal generated according to an inflow of the fault current.

The fault current limiter may further comprise a power diode connected in series with the second circuit to prevent an inverse voltage from being developed by the power semiconductor element switch.

The fault current limiter may further comprise a power diode connected in series with the driving coil to prevent an inverse voltage from being developed by the power semiconductor element switch.

The power semiconductor element switch may be activated by an electric signal induced at an insulation transformer that is connected parallel with the superconductor when the superconductor is quenched.

The power semiconductor element switch may be activated by an electric signal from an operation sensor that detects a movement of the repeller caused by a magnetic field generated by an inflow of the fault current in the driving coil. And, the power semiconductor element switch may be activated by an electric signal caused by a magnetic field generated by an inflow of the fault current in the driving coil.

The power semiconductor element switch may be activated by an electric signal generated when the short contact is closed according to a movement of the repeller caused by an inflow of the fault current.

The superconductor may comprise a thin film superconductor or a thin film wire-type superconductor.

The superconductor may comprise a Y—Ba—Cu—O based high temperature superconductor or a Bi—Sr—Ca—Cu—O based high temperature superconductor.

The current limiting unit may comprise a fault current cutoff component and a load resistor connected parallel with the fault current cutoff component, the fault current cutoff component blocking the fault current.

The fault current cutoff component may be selected from a group consisting of a power fuse, a non-linear variable conductor, and a superconductor. The power semiconductor element switch may be selected from a group consisting of an insulated gate bipolar transistor (IGBT), a gate turn-off thyristor (GTO), an integrated gate communicated thyristor (IGCT), and a thyristor.

Another exemplary embodiment of the present invention provides a method of limiting a fault current using the hybrid-type superconducting fault current limiter according to an exemplary embodiment of the present invention.

BRIEF DESCRIPTION OF THE DRAWINGS

The invention is described more fully hereinafter with reference to the accompanying drawings, in which embodiments of the invention are shown. This invention may, however, be embodied in many different forms and should not be construed as limited to the embodiments set for the herein.

DESCRIPTION OF EXEMPLARY EMBODIMENTS

Hereinafter, constructions and operations of the present invention will be described with reference to accompanying drawings.

Figure 6:
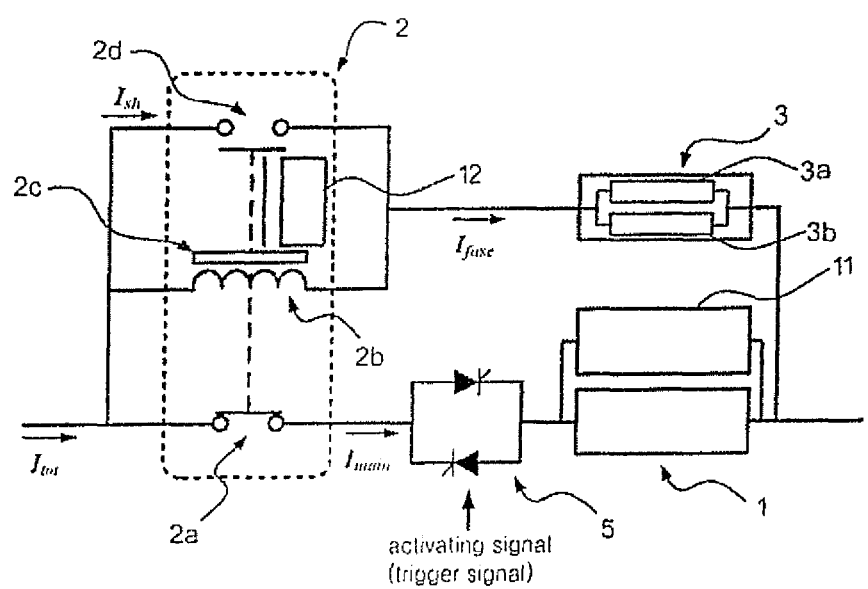
FIG. 6 is a circuit diagram schematically illustrating a hybrid-type superconducting fault current limiter that includes a power semiconductor element switch according to a first exemplary embodiment of the present invention.

FIG. 6 is a circuit diagram schematically illustrating a hybrid-type superconducting fault current limiter that includes a power semiconductor element switch according to a first exemplary embodiment of the present invention.

Referring to FIG. 6, the hybrid-type superconducting fault current limiter includes a superconductor 1, a high-speed switch 2, a current limiting unit 3, and a power semiconductor element switch 5.

The superconductor 1 may include a thin film type superconductor and a thin film wire-type superconductor whose resistance is rapidly increased when being quenched. The superconductor 1 may include a Y—Ba—Cu—O based high temperature superconductor or a B—Sr—Ca—Cu—O based high temperature superconductor, but is not limited thereto.

The high-speed switch 2 includes a short contact 2d that consists of two split terminals, an electromagnetic repeller 2c, a driving coil 2b for generating electromagnetic force by an electric current, and a circuit breaker 2a. Here, the electromagnetic repeller 2c may be made of a light and highly conductive metallic material to easily induce an eddy current that has a diamagnetic component.

The current limiting unit 3 includes a fault current cutoff component 3a, such as a power fuse, and a load resistor 3b connected parallel with the fault current cutoff component for limiting a bypass current. The fault current cutoff component may be selected from a group consisting of a power fuse, a non-linear variable conductor, and a superconductor, but is not limited thereto.

The power semiconductor element switch 5 normally maintains an ON state but changes to an OFF state driven by a fault detection signal generated by the inflow of a fault current. Accordingly, the current passing through the superconductor 1 can be completely removed. That is, the hybrid-type superconducting fault current limiter according to the exemplary embodiment of the present invention, can prevent the superconductor from being damaged by blocking the high fault current using the superconductor 1 and removing the remaining arc current using the power semiconductor element switch 5. The power semiconductor element switch 5 may be selected from a group consisting of an integrated gate communicated thyristor (IGBT), a gate turn-off thyristor (GTO), an insulated gate bipolar transistor (IGCT), and a thyristor, but is not limited thereto.

Hereinafter, an operation of the hybrid-type superconducting fault current limiter including a power semiconductor element switch 5 will be described according to an exemplary embodiment of the present invention.

While the hybrid-type superconducting fault current limiter operates in a normal operation state, the superconductor 1 that is in a cryogenic state does not have resistance and the power semiconductor element switch 5 is in an ON state. At this time, current flows through the superconductor 1, the switch 5, and the circuit breaker 2a that are cascaded, so that the fault current limiter may stably operate without any line loss.

However, when a current whose value is in excess of a critical current value for superconductor 1 is applied to the superconductor 1, the superconductor 1 loses its superconductivity and changes to the normal conductive state, and therefore, its resistance drastically increases. Accordingly, when a fault current flows in the fault current limiter, the resistance is swiftly generated in the superconductor 1 and the fault current bypasses to the driving coil 2b. At this time, electromagnetic force is developed, which causes the repeller 2c located on the driving coil 2c to move fast, thus activating the circuit breaker 2a and short contact 2d that is mechanically linked with each other. Accordingly, the circuit breaker 2a is open to cut off the current that passes through the superconductor 1, and simultaneously, the short contact 2d is closed, thus bypassing the fault current that goes through the driving coil 2b. As a result, the whole fault current is transferred to the current limiting unit 3 through the short-circuited short contact 2c, and then limited by the current limiting unit 3.

Figure 1:
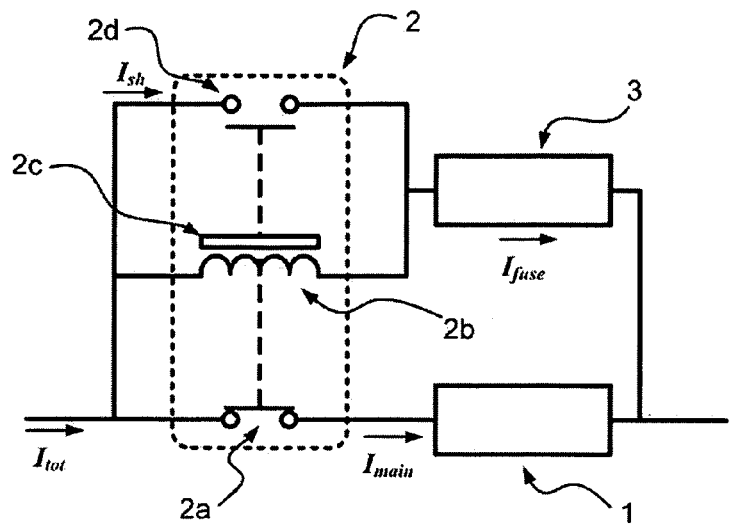
FIG. 1 is a circuit diagram illustrating a structure of a hybrid-type superconducting fault current limiter according to a prior art.
Figure 2:
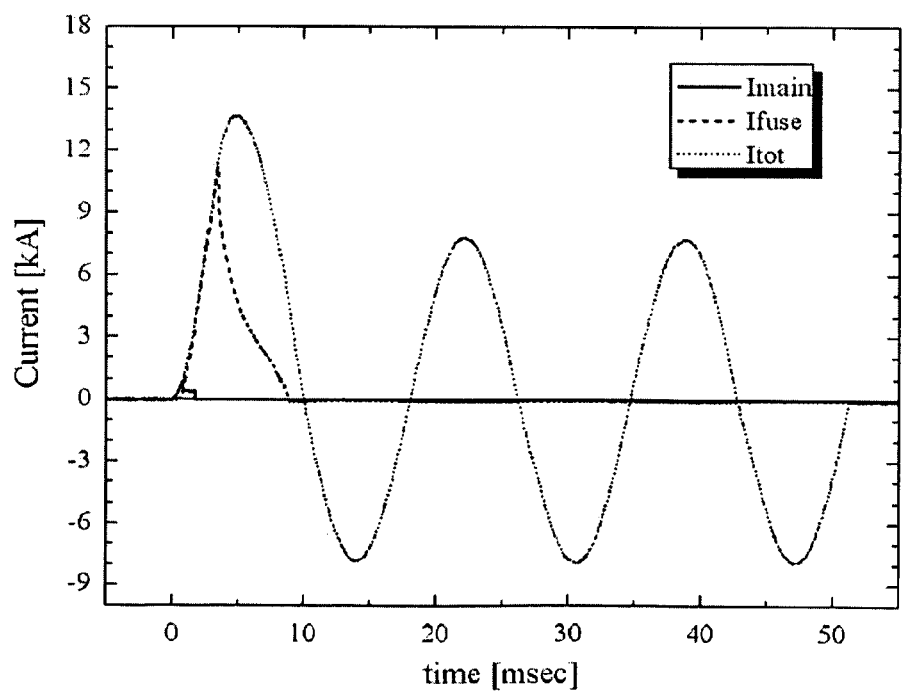
FIG. 2 is a graph showing a test result of the hybrid-type superconducting fault current limiter of FIG. 1.
Figure 3:
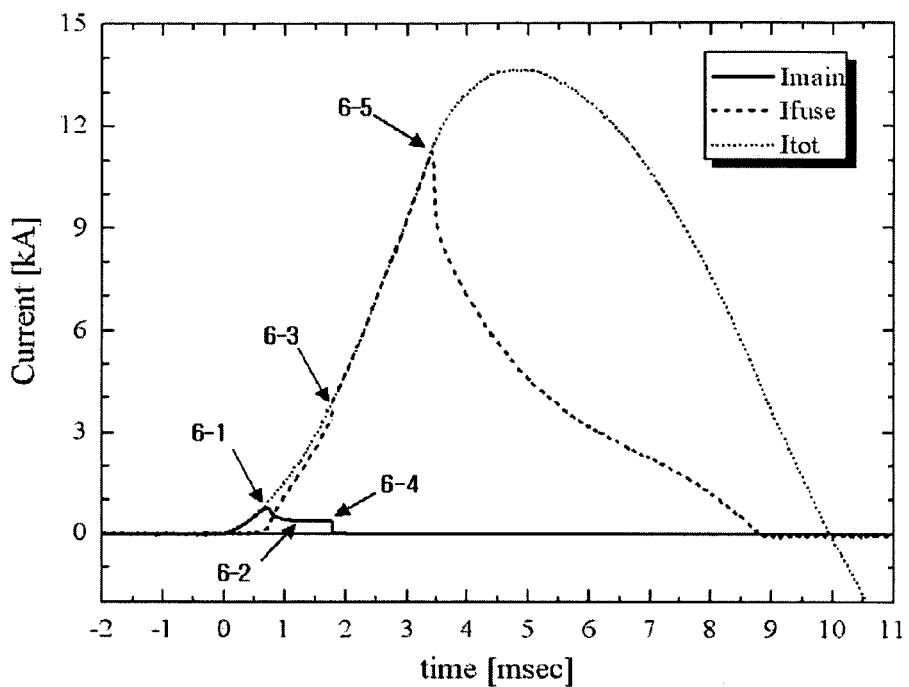
FIG. 3 is a graph showing operational points of time of the hybrid-type superconducting fault current limiter based on the test result of FIG. 2.
Figure 4:
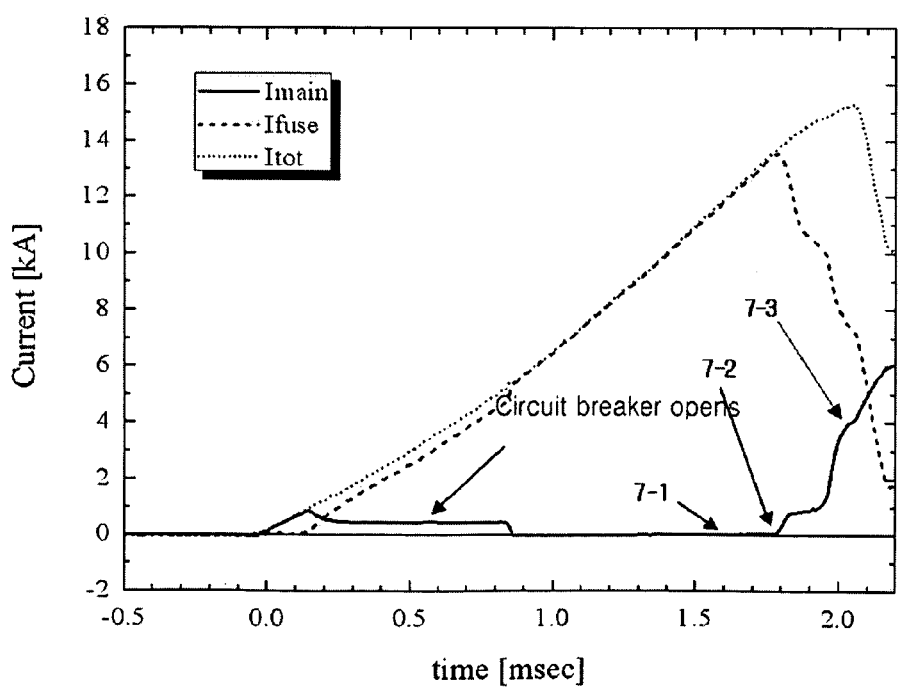
FIG. 4 is a graph showing a test result when the electric arc was not blocked by the main circuit of the fault current limiter of FIG. 1.
Figure 5:
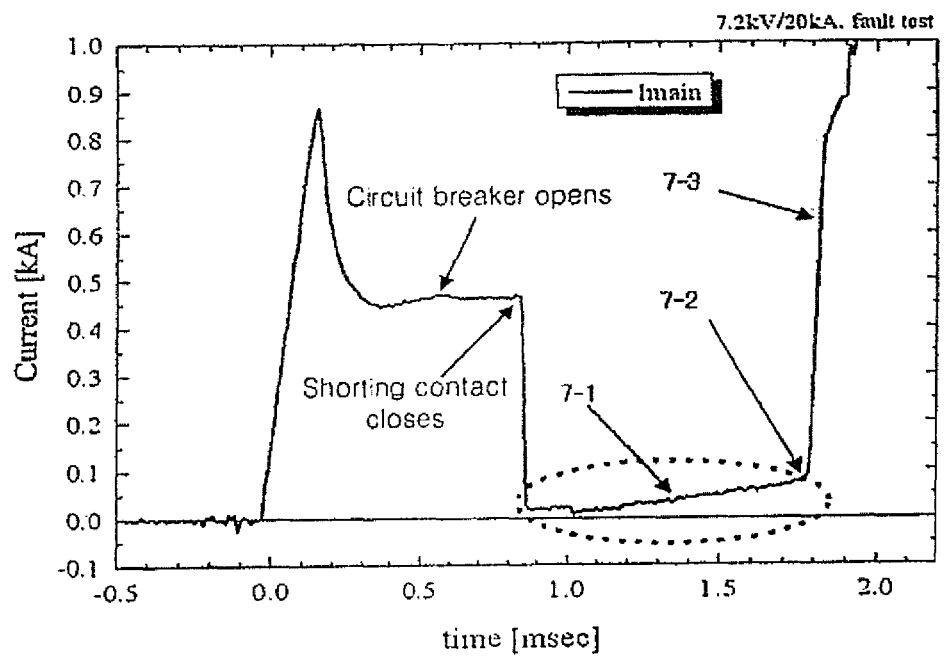
FIG. 5 is a graph showing a test result of $I_{main}$ when the electric arc was not blocked by the main circuit of the fault current limiter of FIG. 1.

In a case where there occurs no resistance before the fault current is limited by the current limiting unit 3, the fault current limiter may be stably operated as shown in FIGS. 2 and 3. However, when the fault current increases and the resistance is produced at the current limiting unit 3 as shown in FIGS. 4 and 5, time required to remove the arc current occurring across the circuit breaker 2a is extended (7-1). Therefore, an electric arc is reproduced across the circuit breaker 2a (7-2) and the fault current returns to the main circuit, which may apply a high voltage to the superconductor 1, so that the fault current limiter may be entirely broken down.

To avoid this condition, it is required to completely get rid of the initial resistance in the current limiting unit 3 or eliminate as fast as possible the arc current (7-1) developing when the circuit breaker 2a opens by keeping the resistance of the superconductor 1 high. For this purpose, the power semiconductor element switch 5 is connected in series with the main circuit as shown in FIG. 6. The switch 5 normally maintains an ON state, but changes to an OFF state immediately when receiving a fault detection signal, so that the arc current occurring across the circuit breaker 2a may be removed quickly and completely. Therefore, the circuit breaker 2a may operate in a no-load state and the line commutation may be completely performed, thus making it possible to improve the reliability of the fault current limiter.

Here, the switch 5 may start to operate through the electric signal induced by an insulation transformer 11 that is connected parallel with the superconductor 1 when the superconductor 1 is quenched, or through a signal from an operation sensor 12 that detects the movement of the repeller 2c caused by a magnetic field generated by the inflow of the fault current in the driving coil 2b. Also, the switch 5 may be operated through a signal of indicating the occurrence of a magnetic field at the driving coil 2b from the inflow of the fault current, or through a signal generated when the short contact is closed by the movement of the repeller 2c from the inflow of the fault current, but it is not limited thereto.

When the process of limiting the fault current is finished and therefore the fault current is cut off, then the superconductor 1 returns to its superconductive state and the switch 5 changes to ON state to prepare another process of limiting the fault current.

Figure 7:
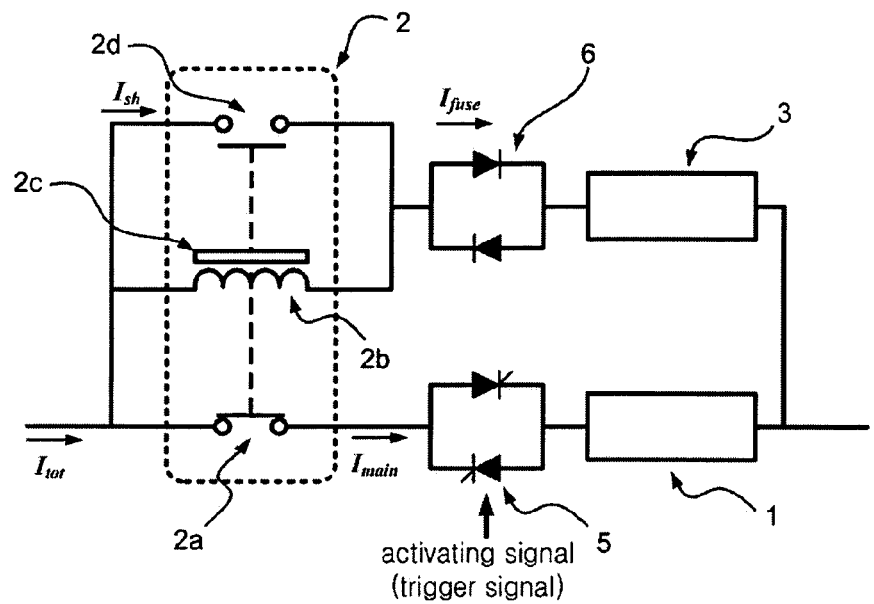
FIG. 7 is a circuit diagram schematically illustrating a hybrid-type superconducting fault current limiter that includes a power semiconductor element switch according to a second exemplary embodiment of the present invention.
Figure 8:
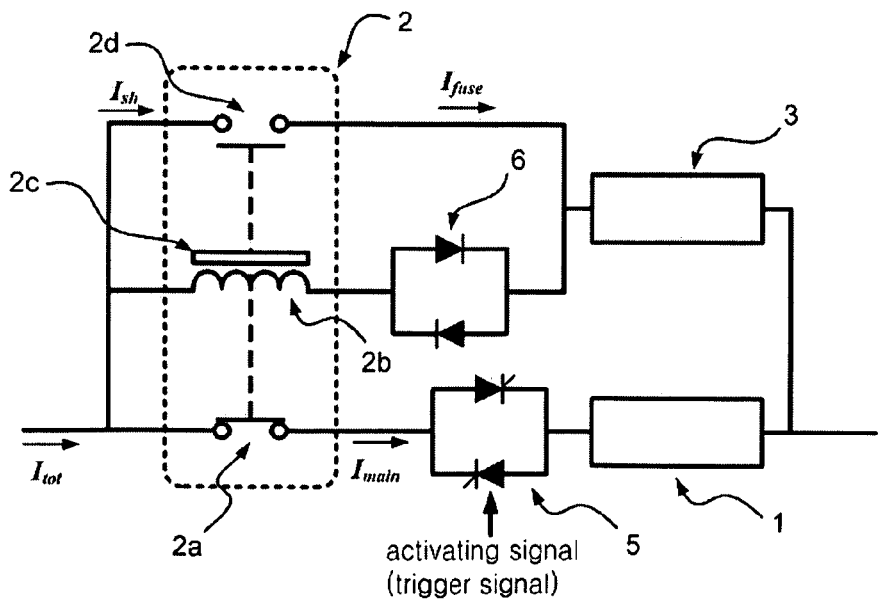
FIG. 8 is a circuit diagram schematically illustrating a hybrid-type superconducting fault current limiter that includes a power semiconductor element switch according to a third exemplary embodiment of the present invention.

FIGS. 7 and 8, respectively, are circuit diagrams schematically illustrating a hybrid-type superconducting fault current limiter that includes a power semiconductor element switch according to second and third exemplary embodiments of the present invention. FIG. 7 shows a case where a power diode 6 is additively connected in series with the current limiting unit 3 to prevent the inverse voltage that can be developed during an operation of the switch 5 immediately after the occurrence of the fault current. However, the fault current limiter shown in FIG. 7 has a disadvantage in that high-capacity diodes should be used since the limited fault current needs to keep flowing through the power diode 6. In a case where the power diode 6 for preventing an inverse voltage is connected in series with the driving coil 2b as shown in FIG. 8, the inverse voltage is blocked at the first stage of the occurrence of the fault current and then the short contact 2d is closed, so that the fault current does not pass through the diode 6 any longer. Therefore, it can be possible to use a diode having lower capacity than that used in FIG. 7.

Figure 9:
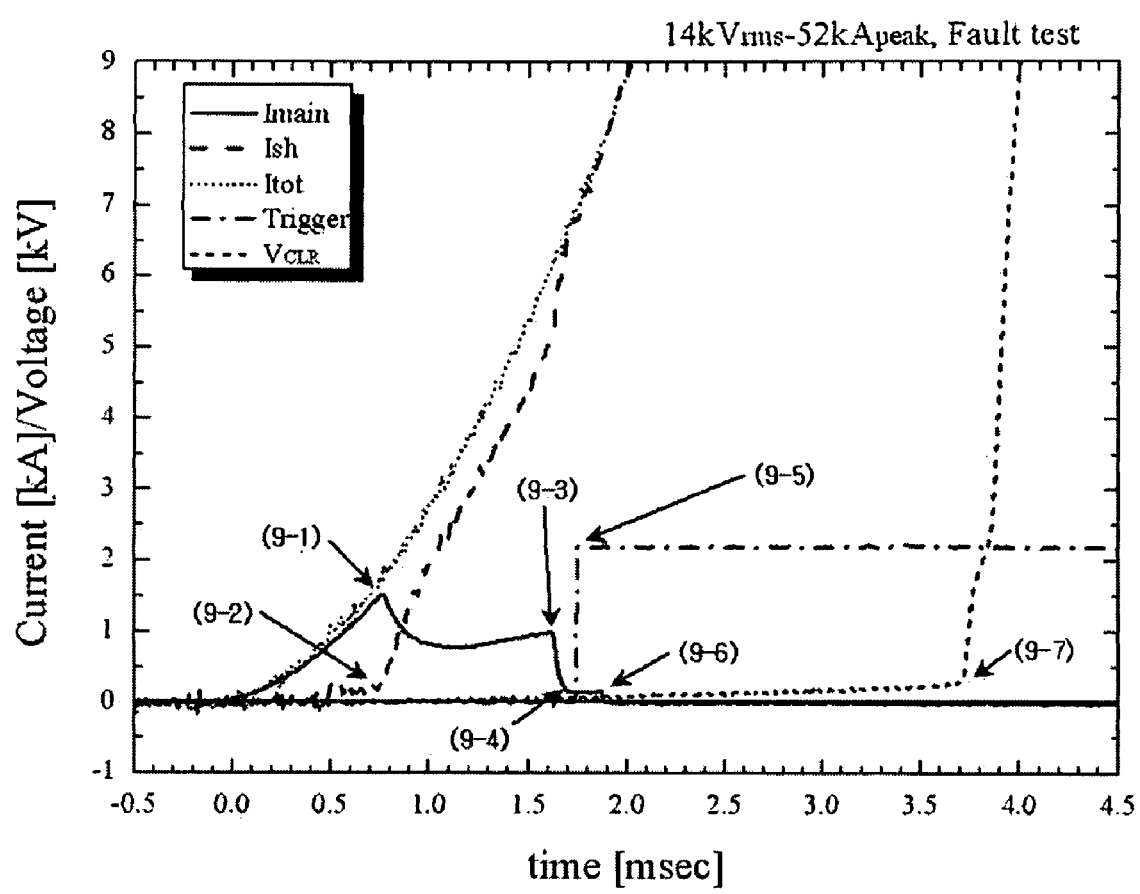
FIG. 9 is a graph showing a test result of a hybrid-type superconducting fault current limiter that includes a power semiconductor element switch according to an exemplary embodiment of the present invention.

FIG. 9 is a graph showing a test result of a hybrid-type superconducting fault current limiter that includes a power semiconductor element switch according to an exemplary embodiment of the present invention. A test circuit was configured as in FIG. 7, a YBCO thin film superconductor was used as the superconductor I and an IGBT element was used as the switch 5. The current limiting unit 3 consists of a current limiting fuse and a resistor connected parallel with each other. Also, the switch 2 is configured to be activated through a signal generated by a separate circuit when the short contact 2d is mechanically closed. Referring to FIG. 9, the superconductor 1 is quenched (9-1) and simultaneously the fault current is bypassed (9-2) to the driving coil 2b immediately after an event occurred, so that a magnetic field is generated, thus activating the repeller 2c. Accordingly, the short contact 2d is closed (9-3), and the circuit breaker 2a is open, so that an arc current remains across the circuit breaker 2a (94). The moment the short contact 2d is closed, a signal for activating the switch 5 is generated (9-5). Accordingly, the switch activated by the signal causes high impedance (9-6), thus removing the electric arc occurring across the circuit breaker 2a. Then, the fault current is bypassed to the current limiting unit 3 and the current limiting fuse in the element 3 operates at 3.7 ms after the event occurrence (9-7), thereby to limit the fault current.

As mentioned above, the hybrid-type superconducting fault current limiter according to exemplary embodiments of the present invention may improve its operational reliability through the removal of its mal functions by completely eliminating the remaining arc current of the circuit breaker or making the circuit breaker operate in a no-load state.

What is claimed is:

1. A hybrid-type superconducting fault current limiter for rapidly limiting a fault current, the fault current limiter having a first circuit and a second circuit which are connected in parallel with each other, wherein the first circuit includes a superconductor and a circuit breaker which are connected in series with each other, and wherein the second circuit includes a driver having a driving coil and an electromagnetic repeller, a short contact connected in parallel with the driver, and a current limiting unit connected in series with a third circuit including the driver and the short contact, the hybrid-type superconducting fault current limiter comprising:
   a power semiconductor element switch connected in series with the first circuit, the power semiconductor element switch normally maintaining an ON state and being activated and changed into an OFF state generated according to an inflow of the fault current so as to remove remaining arc current occurring in the circuit breaker when the circuit breaker is opened.

2. The hybrid-type superconducting fault current limiter of claim 1, further comprising:
   a power diode connected in series with the second circuit to prevent an inverse voltage from being developed by the power semiconductor element switch.

3. The hybrid-type superconducting fault current limiter of claim 1, further comprising:
   a power diode connected in series with the driving coil to prevent an inverse voltage from being developed by the power semiconductor element switch.

4. The hybrid-type superconducting fault current limiter of claim 1, wherein
   the power semiconductor element switch is activated by an electric signal induced at an insulation transformer that is connected parallel with the superconductor when the superconductor is quenched.

5. The hybrid-type superconducting fault current limiter of claim 1, wherein
   the power semiconductor element switch is activated by an electric signal from an operation sensor that detects a movement of the repeller caused by a magnetic field generated by an inflow of the fault current in the driving coil.

6. The hybrid-type superconducting fault current limiter of claim 1, wherein
   the power semiconductor element switch is activated by an electric signal caused by a magnetic field generated by an inflow of the fault current in the driving coil.

7. The hybrid-type superconducting fault current limiter of claim 1, wherein
   the power semiconductor element switch is activated by an electric signal generated when the short contact is closed according to a movement of the repeller caused by an inflow of the fault current.

8. The hybrid-type superconducting fault current limiter of claim 1, wherein
   the superconductor comprises a thin film superconductor or a thin film wire-type superconductor.

9. The hybrid-type superconducting fault current limiter of claim 1, wherein
   the superconductor comprises a Y—Ba—Cu—O based high temperature superconductor or a Bi—Sr—Ca—Cu—O based high temperature superconductor.

10. The hybrid-type superconducting fault current limiter of claim 1, wherein
    the current limiting unit comprises a fault current cutoff component and a load resistor connected parallel with the fault current cutoff component, the fault current cutoff component blocking the fault current.

11. The hybrid-type superconducting fault current limiter of claim 10, wherein
    the fault current cutoff component is selected from a group consisting of a power fuse, a non-linear variable conductor, and a superconductor.

12. The hybrid-type superconducting fault current limiter of claim 1, wherein
    the power semiconductor element switch is selected from a group consisting of an integrated gate communicated thyristor (IGBT), a gate turn-off thyristor (GTO), an insulated gate bipolar transistor (IGCT), and a thyristor.

13. The hybrid-type superconducting fault current limiter of claim 2, wherein the power semiconductor element switch is activated by an electric signal induced at an insulation transformer that is connected parallel with the superconductor when the superconductor is quenched.

14. The hybrid-type superconducting fault current limiter of claim 3, wherein the power semiconductor element switch is activated by an electric signal induced at an insulation transformer that is connected parallel with the superconductor when the superconductor is quenched.

15. The hybrid-type superconducting fault current limiter of claim 2, wherein the power semiconductor element switch is activated by an electric signal from an operation sensor that detects a movement of the repeller caused by a magnetic field generated by an inflow of the fault current in the driving coil.

16. The hybrid-type superconducting fault current limiter of claim 3, wherein the power semiconductor element switch is activated by an electric signal from an operation sensor that detects a movement of the repeller caused by a magnetic field generated by an inflow of the fault current in the driving coil.

17. The hybrid-type superconducting fault current limiter of claim 2, wherein the power semiconductor element switch is activated by an electric signal caused by a magnetic field generated by an inflow of the fault current in the driving coil.

18. The hybrid-type superconducting fault current limiter of claim 2, wherein the power semiconductor element switch is activated by an electric signal generated when the short contact is closed according to a movement of the repeller caused by an inflow of the fault current.

19. The hybrid-type superconducting fault current limiter of claim 3, wherein the power semiconductor element switch is activated by an electric signal generated when the short contact is closed according to a movement of the repeller caused by an inflow of the fault current.

* * * * *